United States Patent [19]

Hatfield et al.

[11] 4,412,859

[45] Nov. 1, 1983

[54] METHOD FOR RECOVERING PLATINUM IN A NITRIC ACID PLANT

[75] Inventors: W. Robert Hatfield, Westfield; Ronald M. Heck, Frenchtown; Thomas H. Hsiung, Piscataway, all of N.J.

[73] Assignee: Engelhard Corporation, Iselin, N.J.

[21] Appl. No.: 403,996

[22] Filed: Aug. 2, 1982

Related U.S. Application Data

[63] Continuation-in-part of Ser. No. 292,113, Aug. 12, 1981, and Ser. No. 292,114, Aug. 12, 1981.

[51] Int. Cl.³ .......................... C22B 11/00; B22F 3/00
[52] U.S. Cl. ...................................... 75/83; 428/567; 428/593; 423/403; 245/2
[58] Field of Search .................... 75/83, 109; 428/567, 428/593, 596, 608, 544, 549; 423/403; 245/2

[56] References Cited

U.S. PATENT DOCUMENTS

| | | | |
|---|---|---|---|
| 2,271,662 | 2/1942 | Rubissow | 140/7 |
| 2,313,581 | 3/1943 | Reed | 245/2 |
| 2,648,393 | 8/1953 | Holzmann . | |
| 2,730,189 | 1/1956 | Holzmann . | |
| 2,747,679 | 5/1956 | Ruthardt . | |
| 2,920,953 | 1/1960 | Rudorfer | 423/222 |
| 3,132,099 | 5/1964 | Eilhauer | 210/507 |
| 3,155,460 | 11/1964 | Mears | 428/596 |
| 3,427,185 | 2/1969 | Cheatham et al. | 428/567 |
| 3,434,826 | 3/1969 | Holzmann | 75/83 |
| 3,515,541 | 6/1970 | Wimmer et al. | 75/83 |
| 3,660,024 | 5/1972 | Gillespie | 423/403 |
| 3,873,675 | 3/1975 | Roters | 423/403 |
| 3,915,898 | 10/1975 | Acres et al. | 252/470 |
| 4,239,833 | 12/1980 | Retmaniak | 428/567 |

FOREIGN PATENT DOCUMENTS

| | | |
|---|---|---|
| 1082105 | 9/1967 | United Kingdom . |
| 2050189 | 1/1981 | United Kingdom . |

OTHER PUBLICATIONS

H. Holzmann (1); "Platinum Metals Review", vol. 13, [No. 1]:pp. 2-8, Jan. 1969; Platinum Recovery in Ammonia Oxidation Plants; A New Process Using Gold-Palladium Catchment Gauzes; Pub. by Johnson-Matthey & Co. Ltd.
H. Holzmann (2); Chemie-Ingenieur-Technic, vol. 40, [No. 24], pp. 1229-1237, (1968).
A. E. Heywood, "The Recovery of Platinum from Ammonia Oxidation Catalysts," Johnson Matthey Metals Limited, pp. 28-32.
Platinum Metals Review, vol. 13, Jan. 1969, No. 1, Ed. Johnson Matthey & Co., London.
Roberts D. et al., "Estimation of Platinum Catalyst Requirement for Ammonia Oxidation", Reprinted from Advances in Chemistry Series, No. 133, Chem. Reaction Eng. II, ©1974 by ACS.

Primary Examiner—L. Dewayne Rutledge
Assistant Examiner—Christopher W. Brody

[57] ABSTRACT

Improved recovery of platinum lost from the catalyst gauze in a nitric acid plant is obtained by using palladium containing recovery gauzes configured to enhance the mass transfer characteristics of the system.

16 Claims, 10 Drawing Figures

METHOD FOR RECOVERING PLATINUM IN A NITRIC ACID PLANT

CROSS-REFERENCED RELATED APPLICATIONS

This is a continuation-in-part of U.S. Ser. No. 292,113, filed Aug. 12, 1981 and Ser. No. 292,114 filed Aug. 12, 1981.

Nitric acid is produced commercially by passing ammonia and air over an oxidation catalyst which is usually a gauze woven from platinum-rhodium alloy wire. Typically, the temperature of gas leaving the gauze ranges from about 810° C. to about 960° C., most often above 850° C. As ammonia is oxidized, platinum is slowly lost from the gauze, possibly in the form of the more volatile oxides. Rhodium is also lost, but this is not so severe a problem. The rate of loss depends upon the type of plant. Typically, for each ton of ammonia converted, a high pressure plant will lose more than one gram of platinum, while lower pressure plants will lose less. Even though the rate of catalyst loss is slow when expressed in terms of weight, the cost is usually quite substantial. In many operations, the cost of platinum lost during production has been said to be the second largest expense of the operation, exceeded only by the cost of ammonia feedstock.

Many approaches have been tried to recover some of the platinum and rhodium. Filters of various materials have been placed downstream of the catalyst gauze to mechanically catch and retain solid particles of platinum and rhodium. Later, it was discovered that various palladium alloys had the ability to withdraw platinum-containing vapor from the gas stream. The mechanism of this withdrawal has been a subject of some controversy, but it has been theorized that, in the course of the reaction, platinum oxide in the gas phase may revert to platinum, which either returns to the catalyst gauze or is carried away by the stream to possibly alloy with palladium and catalyze formation of volatile palladium compounds. (See Holtzmann, *Chemie-Ingenieur-Technik*, vol. 40, No. 24:1229-37, 1968.) A variety of alloying elements have been selected, mainly for their ability to improve the mechanical properties of palladium. Typical commercial palladium alloys have contained about 80% palladium and 20% gold by weight. The recovery alloys are usually employed in the form of multiple sheets of woven gauze but knitted meshes or other foraminous elements can also be used. The recovery gauze is usually placed as close as possible to the catalyst gauze, often within a few millimeters, usually no more than 10 mm. Since the catalyst gauze in a nitric acid plant is changed regularly on a schedule of from about every 35 to every 270 days, depending on plant design, as a practical matter, the recovery gauze is usually replaced when the catalyst gauze is changed, although it is possible to replace it less frequently. This technology, which is currently widely applied, is described in more detail in U.S. Pat. No. 3,434,820; *Platinum Metals Review*, Vol. 13 [No. 1]: Pages 2-8 (Jan., 1969); British Pat. No. 1,082,105; and in *Chemie-Ingenieur-Technik*, Vol. 40, No. 24: 1229-37 (1968). As applied, the recovery efficiency of each sheet of recovery gauze obtained using this technology has ranged from about 10% to 60%, primarily depending upon the type of plant which is usually specified in terms of the nitrogen loading of the plant.

Using the method of the present invention, it is possible to increase the recovery efficiency of each sheet of recovery gauze by several percent resulting in the annual recovery of more than a hundred additional troy ounces of platinum in a medium pressure plant or to obtain equivalent recoveries with fewer sheets of gauze. These improvements can make a very significant difference in the economic viability of a nitric acid plant. This savings would be less for lower pressure plants, but for higher pressure plants, the savings become even more substantial. These savings are now possible because it has been discovered that it is possible to estimate the efficiency of platinum recovery of high palladium content gauzes based on the model that the process is mass transfer limited, that is, the rate of withdrawal of platinum from the stream of gas coming from the catalyst gauze is determined or limited by the rate at which the platinum species diffuses through the gas to the surface of the recovery gauze, the rate at which platinum at the wire surface can be trapped or retained or "alloyed" with the palladium in the gauze being much greater than the rate at which the platinum species can diffuse to the wire surface from the gas stream. On this basis, it is possible to rationally design and optimize the configuration of the gauze to obtain improved efficiency without incurring excessive pressure drop.

Using gauzes designed according to the present invention, it is possible to increase the efficiency of each sheet in the gauze pack by several percent, depending on the nitrogen loading of the plant. The method of the present invention is especially desirable for use in high pressure plants, since not only is more platinum lost per ton of ammonia converted, but also the number of tons of ammonia processed is much greater than in lower pressure plants. Further, prior art single gauze recovery efficiencies for high pressure plants have been distressfully low, as recovering platinum in these plants is extremely difficult. Thus, any improvement is particularly significant for the economics of these plants.

Recovery gauzes, according to the present invention, are designed and fabricated by the process comprising the steps of (1) measuring the flow rate, conditions and composition of the gas-eous stream to be treated with the gauze, then (2) determining the physical properties of the stream, either by measurement or calculation;

(3) determining the mass velocity (G), dynamic viscosity ($\mu$), and Schmidt No. (Sc) for the process stream in which the gauze is to be employed;

(4) estimating the recovery efficiency of a selected gauze sheet based on the assumption that platinum recovery is essentially mass transfer limited; and (5) fabricating and providing a gauze which will provide a single sheet average recovery efficiency over the catalyst cycle within the range of this invention.

For example, recovery efficiencies can be estimated for gauzes until an optimum configuration is determined, which will have an average recovery efficiency exceeding that given in column 2 of Table I.

and an ammonia concentration in the feed of 10 $^m/o$ (mole percent).

Figure 1:
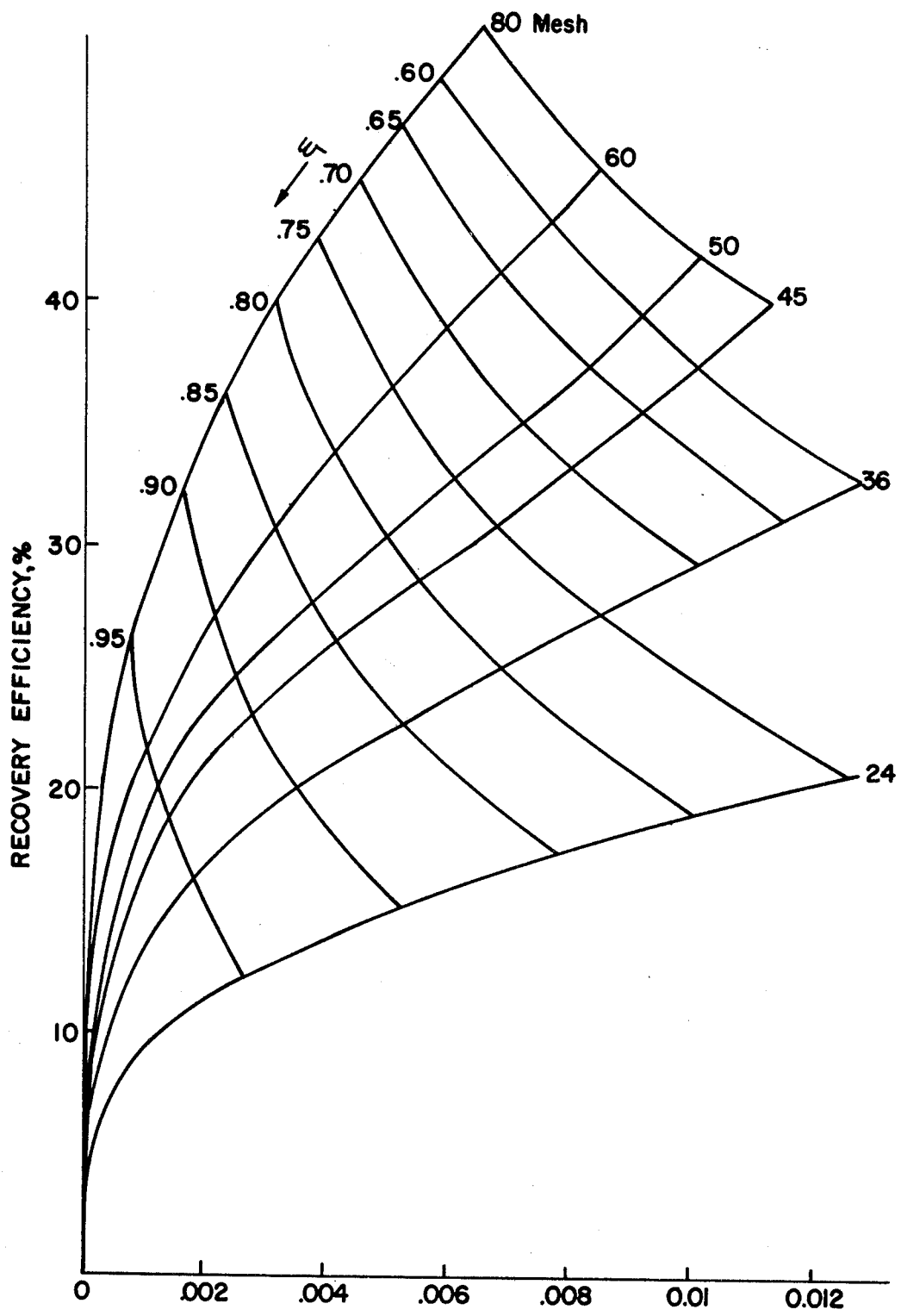
FIG. 1 is a chart showing the predicted instantaneous recovery efficiency of various recovery gauzes in a nitric acid plant, having a nitrogen loading of 15 tons of nitrogen in ammonia per square meter of catalyst gauze per day, operating at a catalyst temperature of 900° C.
Figure 2:
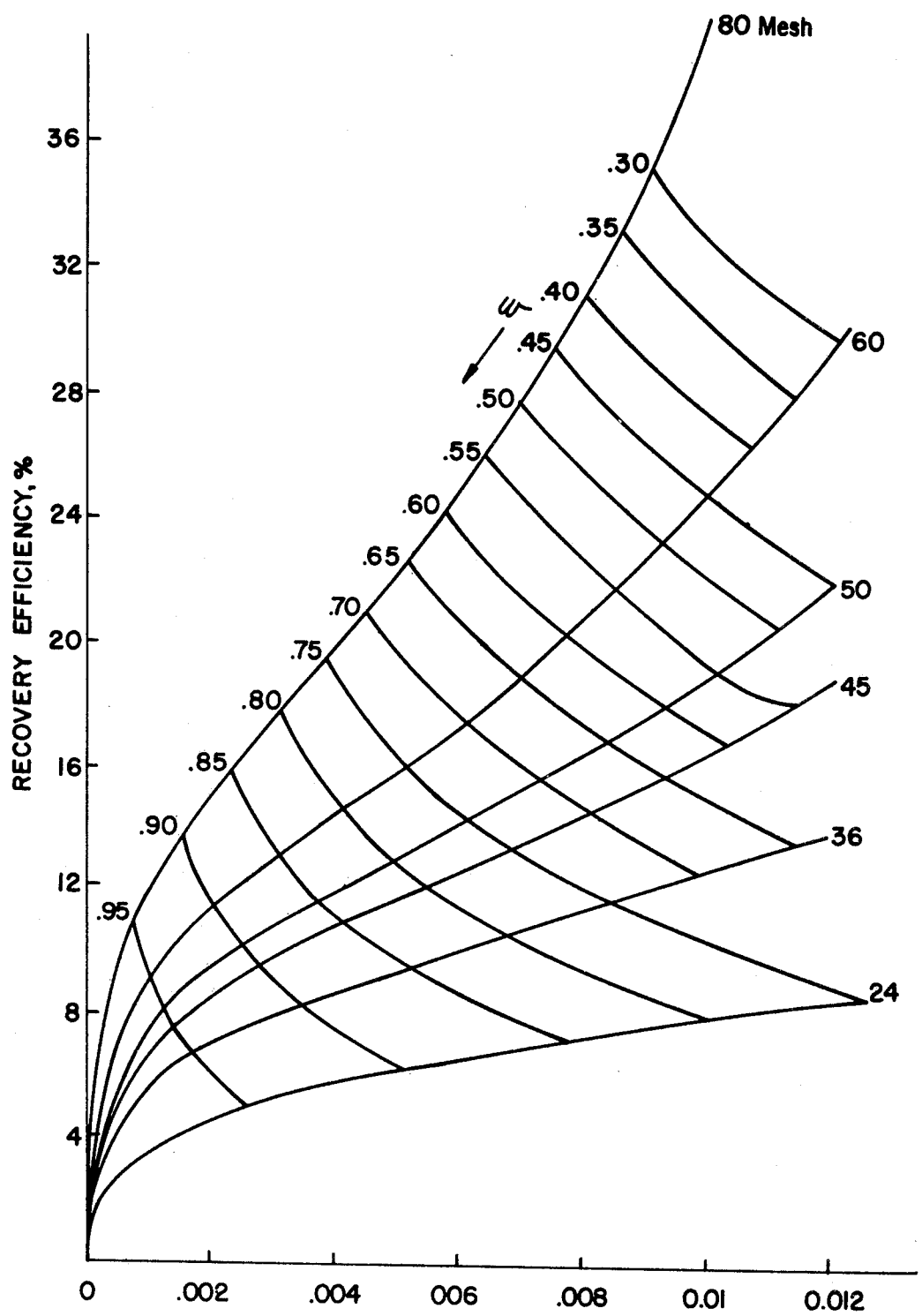
Figure 3:
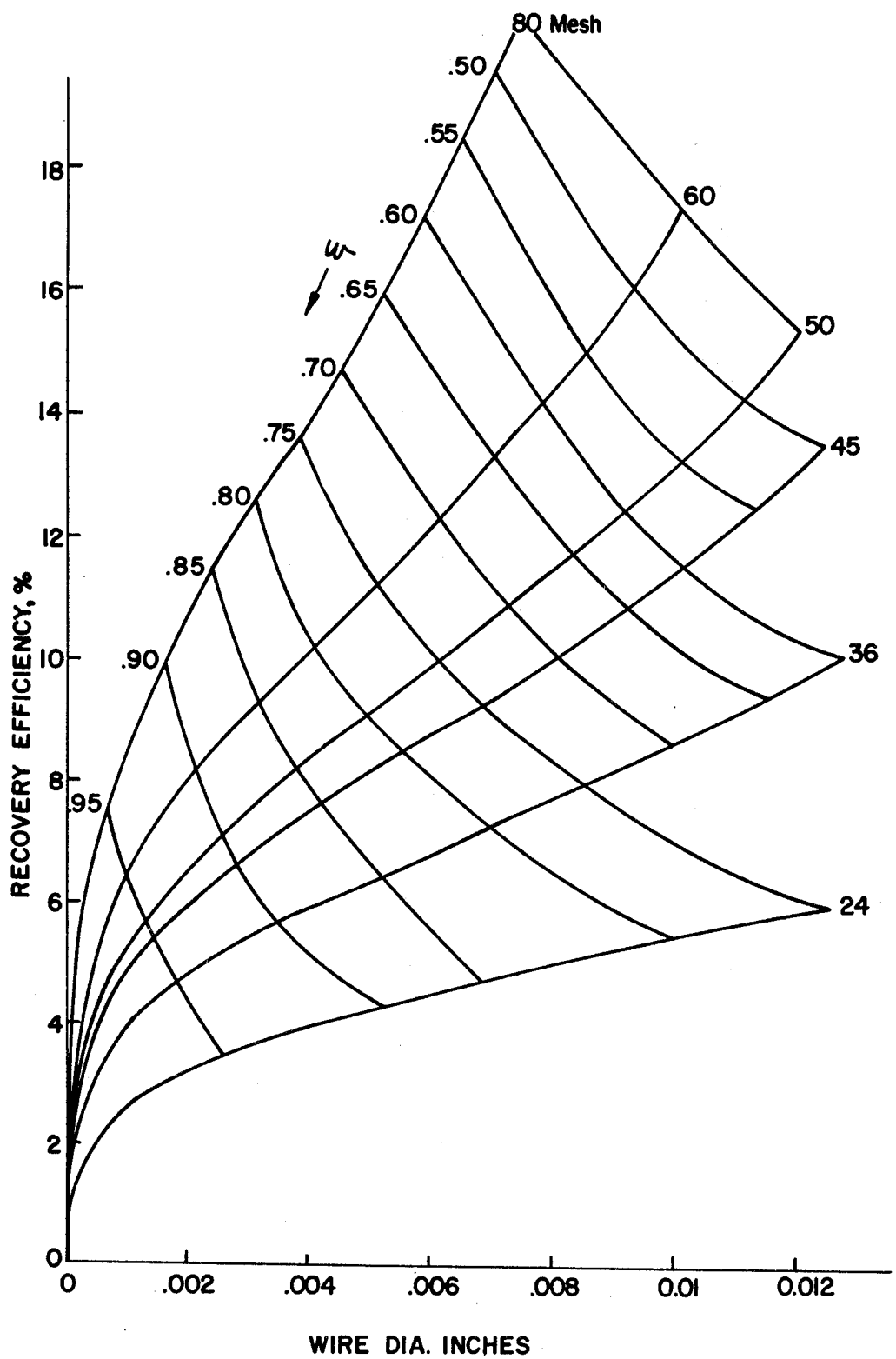

FIGS. 2 and 3 are charts which are analagous to FIG. 1, except that the corresponding nitrogen loadings are 57 and 100 respectively.

Figure 4:
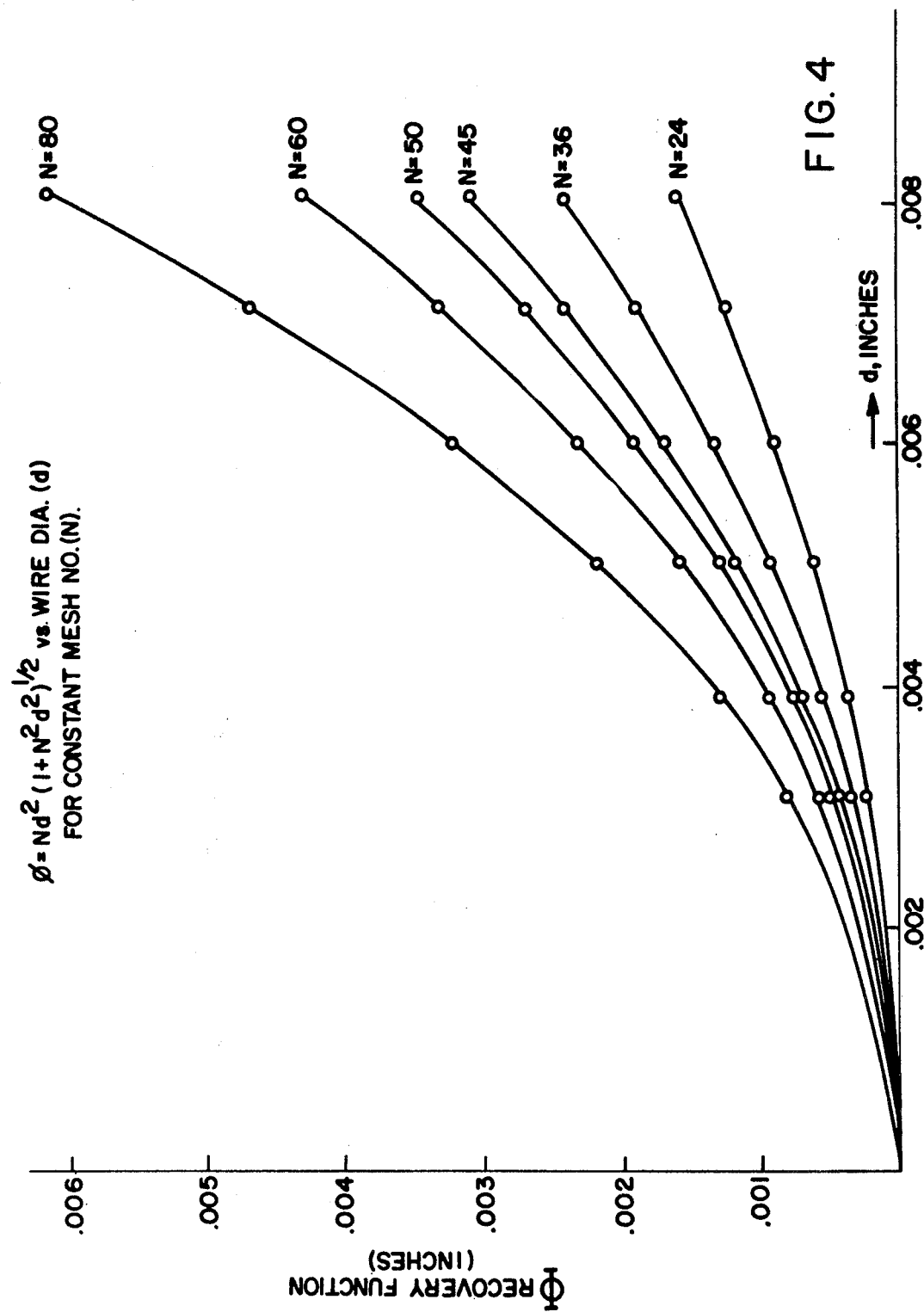

FIG. 4 is a plot of the recovery function "$\phi$" as a function of wire diameter for a variety of mesh numbers for a linen weave gauze.

Figure 5:
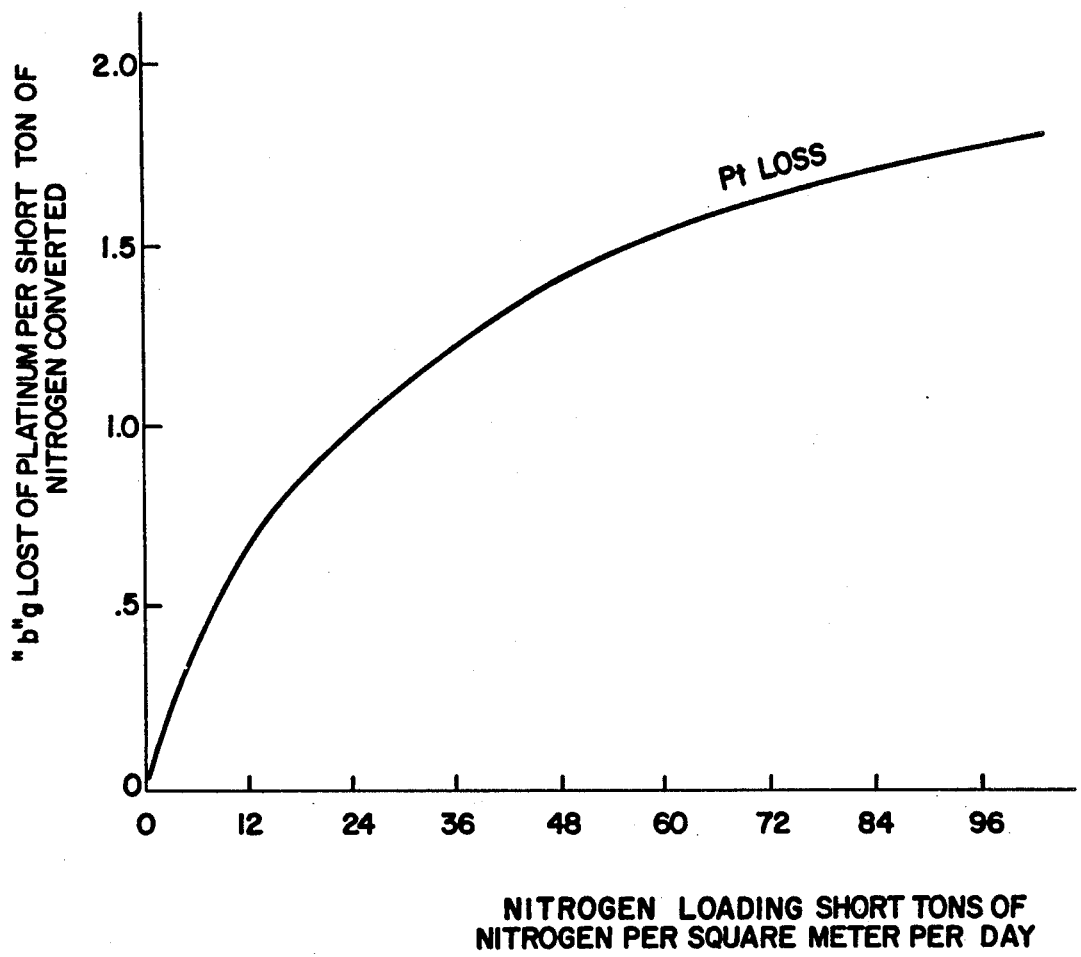

FIG. 5 is a chart showing anticipated platinum loss as a function of nitrogen loading for a typical nitric acid plant.

Figure 6:
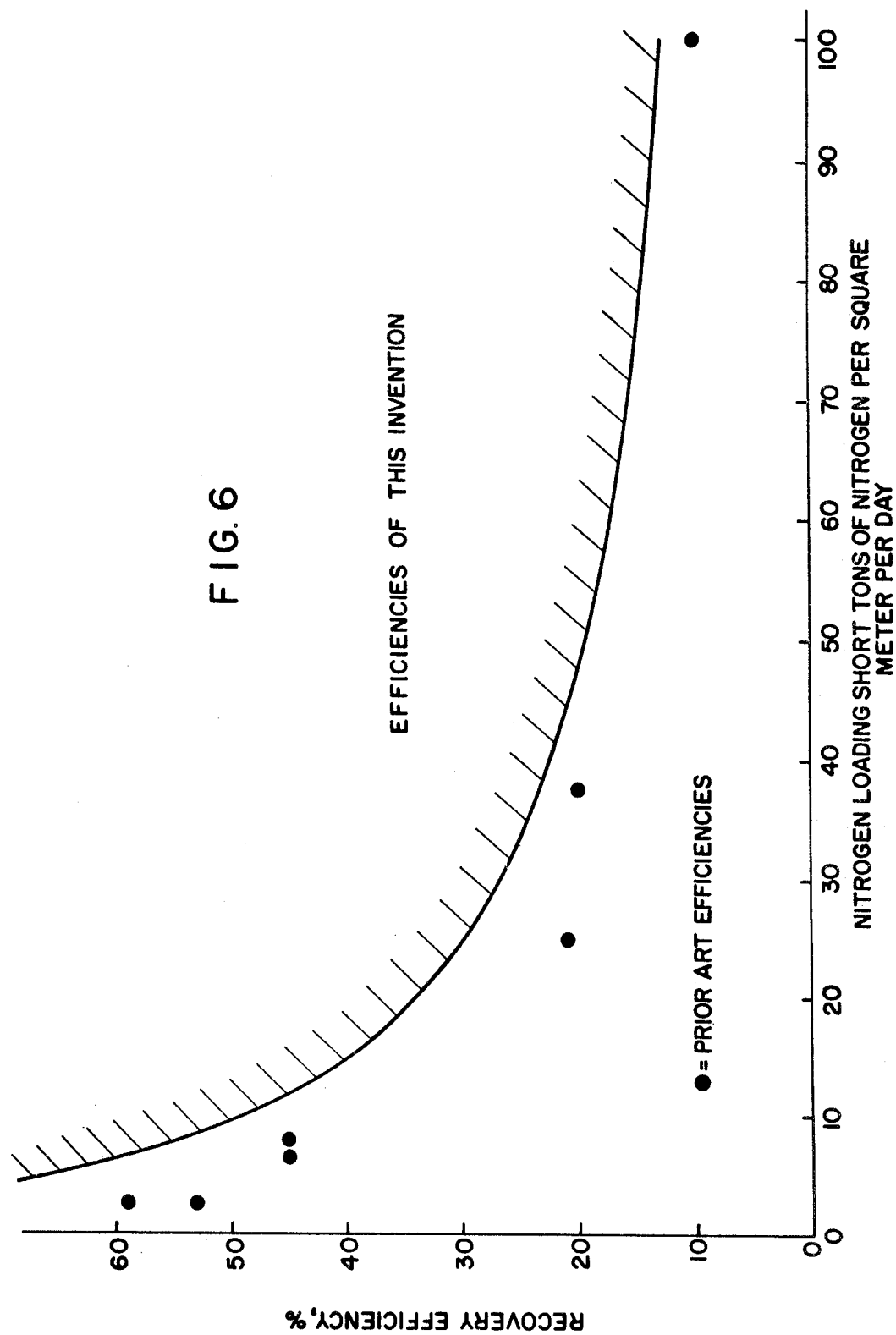

FIG. 6 is a graph showing the average recovery efficiencies obtainable with the present invention over the catalyst cycle as a function of nitrogen loading for a typical plant.

Figure 7:
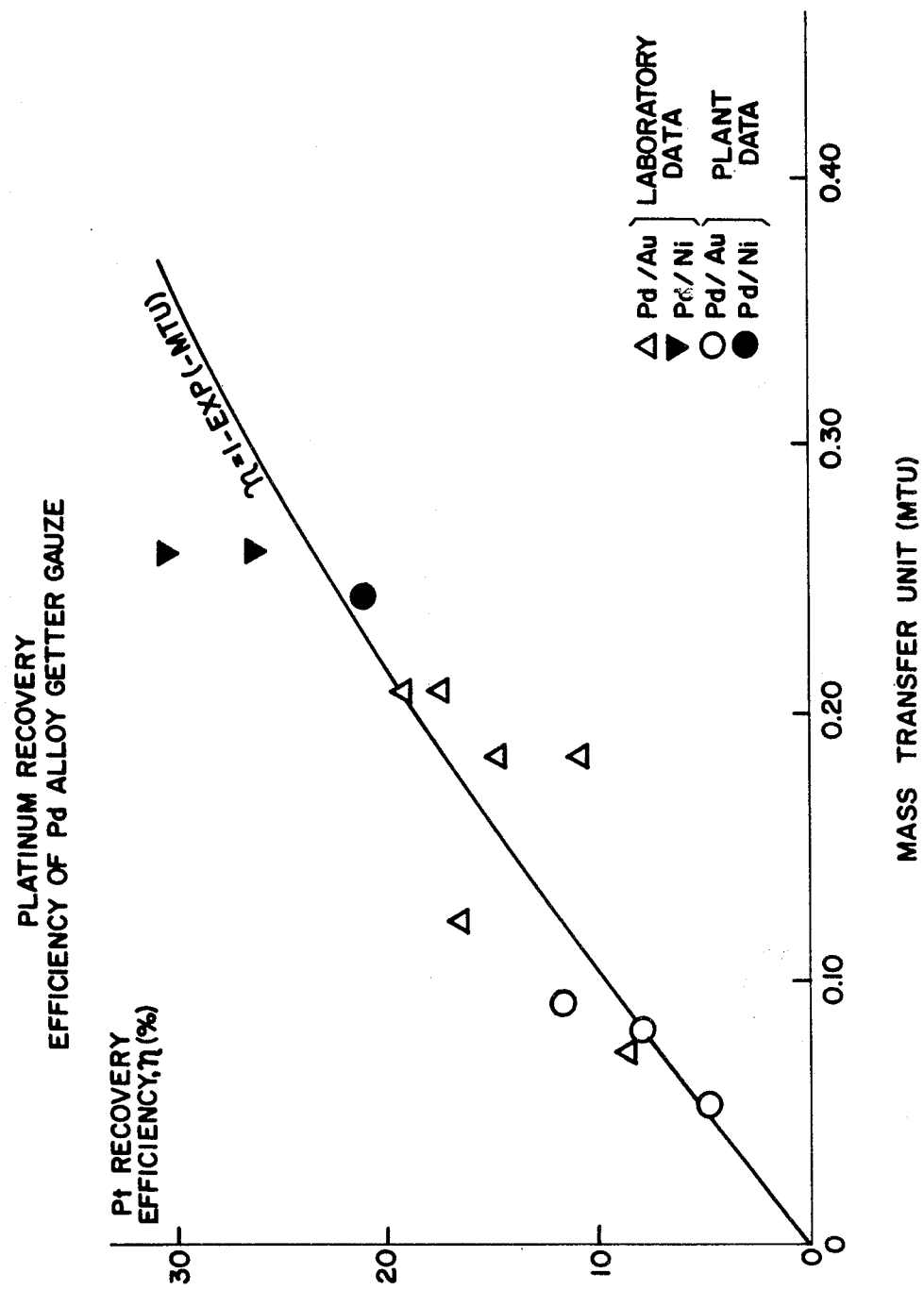

FIG. 7 is a comparison of predicted recovery efficiencies with a number of experimentally determined points.

Figure 8:
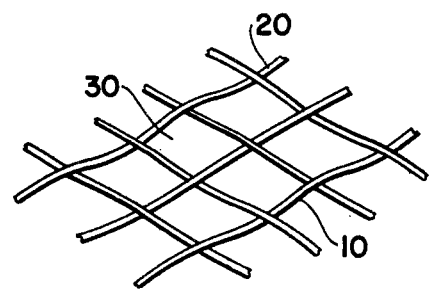

FIG. 8 is an isometric view of a typical linen weave gauze.

Figure 9:
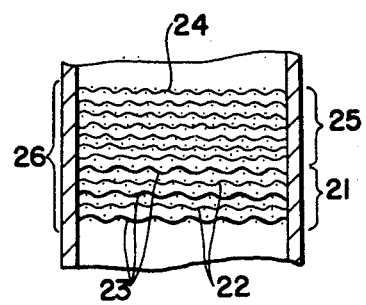

FIG. 9 is a cross-sectional view of the catalyst and recovery gauze package in a nitric acid reactor.

Figure 10:
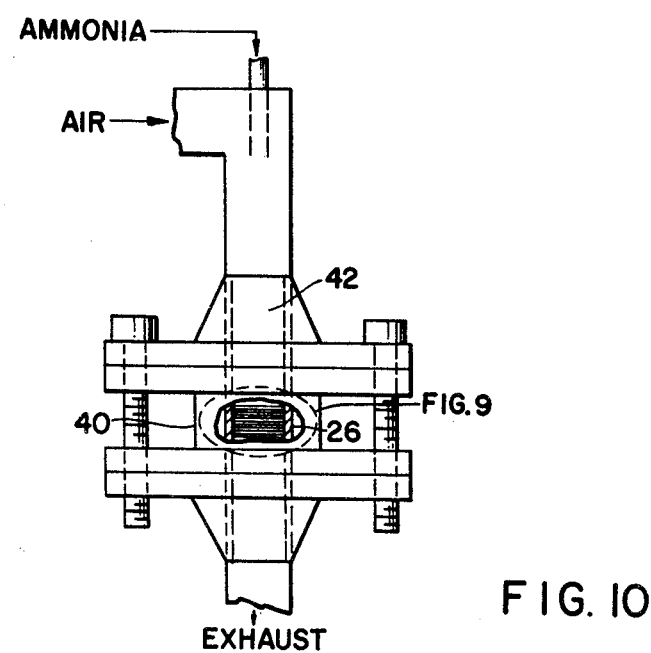

FIG. 10 is a schematic of the nitric acid reactor.

In many cases, high efficiencies can be obtained by using a gauze configuration in which the initial product of the mesh (in wires per unit length) and wire diameter exceeds at least about 0.2 for gauzes containing a major proportion of palladium and a minor proportion of nickel. Preferably, the initial product of the mesh and the wire diameter will be in the range of from about 0.2 to about 0.9. For the lower swelling alloys, such as palladium-gold, the initial product of the mesh and wire diameter should be at least 0.3 and preferably in the range of from about 0.3 to about 0.9, more preferably from about 0.35 to about 0.9. For 95% Pd:5% Ni gauzes, it is preferred that the mesh N be in the range of from about 10 to about 80, $d_w$ is in the range of from about 0.003 to about 0.090 inches, and their respective values are such that the initial product of N and $d_w$ is greater than at least about 0.2.

In practice, for purposes of the present invention under the conditions encountered in most commercial plants, the initial instantaneous recovery efficiencies ($\eta$), that is the percentage of platinum in the stream that is recovered by a single gauze having high palladium content, may be estimated by use of the quasi-empirical formula $$\eta = 1 - \exp\left[-\frac{2C}{Sc^{\frac{2}{3}}} \cdot \frac{ad_w}{Re^m \xi^{1-m}}\right]$$

wherein "$\xi$" is the volumetric void fraction of the gauze which is less than 0.76, preferably less than 0.685, but greater than 0; "Sc" is the Schmidt number for the diffusion of oxidized platinum in the effluent from the catalyst gauze, which is usually between 0.8 and 1.0; "Re" is the Reynolds number based on the wire diameter and average velocity of the process stream just upstream of the recovery gauze, i.e., $$Re = \frac{Gd_w}{\mu},$$

where "G" is the mass velocity of the gaseous stream fed to the catalyst; "$\mu$" is the dynamic viscosity of the effluent from the catalyst gauze; typically, the Reynolds number will be between 10 and 200, most often from 20 to 50; "C" is the appropriate mass transfer correlation coefficient for the geometry of the trial gauze which usually falls within the range of from about 0.4 to 1; "a" is the specific bulk surface area of the gauze; that is, the total surface area of one square inch of gauze divided by its superficial volume, "a" usually has a value within the range of from about 53 to 640 reciprocal inches; "m" is the appropriate mass transfer correlation exponent for the configuration of the gauze usually having a value of from about 0.6–0.8; and "$d_w$" is the diameter of the wires in the gauze. Most of the wires used in gauzes according to the present invention, will have diameters varying between 0.0015 and 0.02 inches.

For a square linen weave gauze, such as those most often encountered in practice, the following approximations are useful:

$$a = \pi[1 + N^2 d_w^2]^{\frac{1}{2}} N$$

where "N" is the mesh or number of wires per inch, and $$\xi = 1 - \tfrac{1}{4}\pi N d_w (1 + N^2 d_w^2)^{\frac{1}{2}}.$$

Methods of determining the appropriate mass transfer correlation coefficient "C" and mass transfer correlation exponent "m" are well-known to those skilled in the art. A notable summary of the literature pertaining to the usual configurations is found in "*Estimation of Platinum Catalyst Requirement for Ammonia Oxidation*" by Roberts and Gillespie in Advances in Chemistry Series, Number 133, Chemical Reaction Engineering II, 1974 pp. 600–611. For more unusual configurations, these constants may be determined experimentally. For the common stacked screen gauzes, suitable correlations may be found in Satterfield and Cortez, Ind. Eng. Chem. Fundamentals (1970) 9, 613 and Shah, Ph.D. Thesis, University of Birmingham, England (1970). For the purposes of this invention, equation 1 will work adequately with values for "C" of 0.94 and for "m" of 0.7 for the screens, reactors and flow conditions described in this application, if the values of Schmidt number and viscosity given below are used, even though the diffusing species may not necessarily be platinum oxide.

To expedite design of the recovery gauze for a particular plant, efficiency vs. wire diameter graphs similar to FIGS. 1, 2 and 3 can be constructed using formula 1.

As a practical matter, the properties of the gas streams vary only by small amounts over the temperature ranges encountered in practice of from about 810° to about 960°, so that properties at 900° C. can be used with only slight error. Similarly, the concentration of the feed to the catalyst is normally regulated to between 10.0 to 10.5 $^m/o$ (mole percent) ammonia and 90.0 to 89.5 $^m/o$ air, so the composition of the reaction products from the catalyst gauze remains constant, so that physical properties in that range can be used. In these ranges, the Schmidt No. is about 0.9–0.95 for diffusion of platinum oxide vapors in air and the dynamic viscosity of the gas is about $42 \times 10^{-5}$ poise.

Accordingly, the efficiency $\eta$ is determined primarily by the mesh "N", and wire diameter "$d_w$", for a given nitrogen loading "L", where the nitrogen loading "L" is the number of short tons of nitrogen (in ammonia) passed through each square meter of the catalyst gauze per day. Thus efficiency can be plotted as a function of wire diameter for a variety of mesh sizes. Further, void fraction can be shown parametrically on the same graph, so that efficiency and the void fraction can be determined simultaneously for each given combination of wire diameter and mesh. For a given void fraction and number of gauze sheets, the pressure drop through the gauze can be estimated using known correlations. To obtain high recovery efficiency without excessive pressure drop across the gauze, it is preferred that the volumetric void fraction ($\eta$) be between about 0.76 and about 0.5. Volumetric void fractions from about 0.5 down to about 0.3 can provide even better recovery efficiencies, but care must be exercised to properly support the recovery gauze so that it is not damaged or displaced by the force of the stream of gas passing through it. In many applications, volumetric void fractions between about 0.685 and about 0.5 will provide an excellent combination of especially high recovery efficiency with acceptable pressure drop. Void fractions of about 0.3 and lower can be used to provide extremely high recovery efficiencies, but many existing plants would require modification of the gauze supports to withstand and properly distribute the resulting force of the stream on the gauze. In some circumstances, the cost of power due to pressure drop may also be of some significance. However, in practice, it is normally sufficient to limit consideration to volumetric void fractions above about 0.3 and preferably in the range of from about 0.5 to about 0.76. The most preferred range of void fractions is from about 0.5 to about 0.685.

The method of fabricating gauzes according to the present invention is easily accomplished by plotting at least a portion of the appropriate efficiency vs. wire diameter graph for the conditions, such as temperature, pressure and nitrogen loading of the plant under consideration. Then the catalyst cycle length line can be plotted on this graph using the following procedure, such that if a mesh and wire diameter combination near the catalyst cycle length line is chosen, the average recovery efficiency of the gauze over the catalyst cycle ($\bar{\eta}$) will be within the range of this invention.

The catalyst cycle length line is plotted by determining which gauzes will yield efficiencies ( ) within the range of this invention by first consulting FIG. 6 and drawing a horizontal line corresponding to the minimum efficiency determined from FIG. 6 across the appropriate efficiency vs. wire diameter graph, such as FIGS. 1-3. Then the appropriate recovery gauze cycle lengths "T" for a variety of mesh sizes and wire diameters above this horizontal line are determined using the formula $$T = \frac{W}{1.25\eta\, bL}$$

wherein "W" is the weight of each square meter of the recovery gauze sheet and "b" is the amount of platinum lost per ton of ammonia processed. In accordance with the model of the present invention, the rate of platinum recovery is approximately constant at least until the recovery gauze cycle length has been reached, but decreases rapidly thereafter. "W" in general is $$\frac{\pi \rho_w}{2} \phi.$$

"$\phi$" for a single linen weave gauze can be determined from FIG. 4. For gauzes of a weave other than linen weave, the weight may be calculated in a similar fashion from first principles or if necessary may be determined empirically. If no better data is available from the plant history or the history of a similar plant, "b" may be estimated from FIG. 5, presenting loss of platinum per ton of nitrogen processed as a function of nitrogen loading on the catalyst gauze. Finally, the catalyst cycle length line is drawn connecting the points where the recovery gauze cycle length "T" coincides with the planned catalyst cycle length of the plant, "Tp". Then a gauze giving an acceptable efficiency and pressure drop is chosen near this line. Preferably, to minimize interest costs, the minimum weight gauze which will both yield an efficiency within the range of this invention and match the planned catalyst cycle length of the plant should be chosen. It is preferred that the gauze sheets used have a weight of less than 2.05 Troy ounces per square foot or more preferably less than 1.9 Troy ounces per square foot.

Provided that the recovery gauze cycle length of preceding gauzes has not been exceeded, the recovery gauze cycle length of the $n^{th}$ gauze is determined by using the formula $$T_n = \frac{W_n}{1.25\eta_n\, bL\left[\prod_{i=1}^{n-1}(1-\eta_i)\right]}$$

where "$\eta_i$" is the recovery efficiency of the $i^{th}$ recovery gauze sheet and $W_n$ is the weight of the nth gauze. As a practical matter, gauzes can be added until costs of lost palladium, interest for the cost of the gauze, fabrication and installation over the operating and recovery cycle are not justified by the weight of the platinum recovered. Normally, from about 0.3 to about 0.5 grams of palladium will be lost from the recovery gauze for each gram of platinum recovered. In many cases, it will be advantageous to use gauzes of relatively coarse mesh and large diameter wires in the initial layers of the recovery gauze, and to use finer mesh, thinner wires, or both, in the succeeding gauzes, even though the efficiency of the initial gauzes may not be as high as could be obtained. By appropriately choosing the mesh and wire diameter for each gauze, it is possible to obtain recovery gauze cycle lengths which are close to the planned catalyst cycle length for each gauze in the pack. This result can be obtained since the efficiency of the downstream gauzes can be made greater than the efficiency of the upstream gauzes.

If it is desired to design recovery packs so that there are approximately equal recovery gauze cycle lengths obtained for each sheet in the pack, the first sheet of the pack should be designed as described previously, so that it will have an average recovery efficiency over the catalyst cycle within the range of this invention; i.e., $-$greater than $1-\exp(-3.45/L^{.7})$. Preferably, the recovery gauze cycle length for this first gauze sheet will be in the range of from about nine-tenths to eleven-tenths of the planned catalyst gauze cycle length for the plant. The geometric configuration of each succeeding gauze sheet may then be chosen, so that the following relationship is approximately satisfied for each gauze sheet:

$$a_n \left(\frac{d_n}{\eta_n}\right)^{1-m} = \frac{Sc^{\frac{2}{3}}}{2C} \left(\frac{G}{\mu}\right)^m \ln\left\{\frac{1 + \frac{\overline{\eta}_i}{\phi_1}\left[\phi_n - \sum_{i=1}^{n}\phi_i\right]}{1 - \frac{\eta_1}{\phi_1}\sum_{i=1}^{n}\phi_i}\right\}$$

where $a_n$, $d_n$ and $\xi_n$ are the specific bulk surface area, wire diameter and void fraction, respectively, for the $n^{th}$ sheet in the gauze; $\overline{\eta}_1$ is the average recovery efficiency of the first gauze; $\eta_i$ and $\phi_i$ are the respective recovery efficiencies and recovery functions for the $i^{th}$ gauze sheet; Sc, G, C, m and $\mu$ are as defined previously, while n is the number of the gauze sheet being designed in the pack. For instance, for the second gauze sheet in the pack, the relationship should be approximately satisfied with n=2, the third with n=3, and so on. Greatly improved results can be obtained by insuring that at least one gauze (preferably at least two) in the pack has an average recovery efficiency exceeding $1-\exp(-3.45/L^{.7})$ and that at least one, but preferably at least two, gauze sheets have a recovery gauze cycle length of from about nine-tenths to about eleven-tenths of the planned catalyst gauze cycle length.

Using the method of the present invention for a given plant, it is possible to obtain average single sheet recovery efficiencies over the catalyst cycle ($\overline{\eta}$) which are greater than the values given in column 2 of Table I. Using preferred configurations, it is possible to obtain average efficiencies greater than those given in column 3. FIG. 6 is a graph illustrating the average recovery efficiencies obtainable over the catalyst cycle length with the gauzes of the present invention as a function of nitrogen loading, as compared to efficiencies reported in the prior art.

In practice, recovery gauzes almost always contain a major proportion of palladium or gold and minor additions of other alloying elments which improve mechanical properties. By major proportion of palladium, it is meant that the recovery gauze contains at least about 70% palladium by weight. Preferably, the recovery gauzes will contain at least about 80% palladium and more preferably 90%. The most preferred recovery gauzes contain at least about 95% palladium by weight. Perhaps the most widely used alloy has been alloy containing 80% palladium and 20% gold. While this alloy has found wide use, alternatives have been sought, since inclusion of gold greatly increases the cost of the gauze. Other alloying elements for palladium include other platinum group metals, nickel, manganese, chromium, carbon, boron, and the like. Particularly useful palladium alloys include palladium/gold, palladium/platinum, palladium/nickel, palladium/copper, palladium/ruthenium, and palladium/silver. Alternatively, gauzes containing a major proportion of gold and a minor proportion of a platinum group metal have been suggested, since it has been reported that gold does not volatilize to the same extent as palladium. The ability of these gold-rich alloys to withdraw platinum seems to be somewhat less than the ability of palladium-rich alloys. In the same fashion as the palladium-rich alloys, the mechanical properties of the gold-rich alloys may be improved by adding metals which have a greater affinity for platinum than for oxygen, such as tantalum, niobium, and the like. Other suitable alloying elements include titanium, zirconium, chromium, nickel, manganese, and the like.

TABLE I

| Plant Loading<br>Tons of Nitrogen<br>As Ammonia Per<br>m² Per Day | Efficiency<br>of Gauzes of<br>the Present<br>Invention | Efficiency<br>of Preferred<br>Gauzes |
|---|---|---|
| 10-15 | 49 | 52 |
| 15-20 | 41 | 44 |
| 20-25 | 35 | 37 |
| 25-30 | 31 | 33 |
| 30-35 | 28 | 30 |
| 35-40 | 25 | 27 |
| 40-45 | 23 | 24 |
| 45-55 | 21 | 22 |
| 55-65 | 19 | 20 |
| 65-75 | 17 | 18 |
| 75-85 | 16 | 16 |
| 85-100 | 15 | 15 |
| 100+ | 13 | 14 |

For purposes of the present invention, the preferred alloys are palladium/gold and palladium/nickel alloys, particularly alloys containing at least about 80% palladium. 95% palladium and 5% nickel is a particularly advantageous alloy for the practice of the present invention, since it is relatively inexpensive, is easily fabricated and upon exposure to the hot platinum-containing effluent, the wires swell and may double in diameter before they are to be removed. In some cases, the diameter of the wires in the gauze may more than double, reaching approximately 2½ times their initial diameter. When properly allowed for, this swelling can be particularly advantageous, as the efficiency of the gauze increases as the wires swell. For example, in a plant having a nitrogen loading of 57 tons per square meter per day, a 36 mesh by 0.0068 in. wire diameter gauze with an initial efficiency of about 11% could provide an efficiency of about 14% after the wires swell to 0.012 in., and over about 18% if the wires reach 2½ times their initial diameter. Thus, a gauze which provided an instantaneous efficiency which was initially outside the range of the present invention, can swell to provide an average efficiency in the range of the present invention providing a much higher efficiency than would have been predicted based on its initial configuration.

Thus, when nickel/palladium gauzes are used, a gauze may be selected such that its recovery efficiency based on its initial configuration is less than $1-\exp(-3.45/L^{.7})$, but upon swelling, these gauzes provide an average recovery efficiency over the catalyst cycle in excess of that given in Table IA.

TABLE IA

| Efficiency | Loading |
|---|---|
| 48 | 10-15 |
| 40 | 15-20 |
| 34 | 20-25 |
| 30 | 25-30 |
| 27 | 30-35 |
| 24 | 35-40 |
| 22 | 40-45 |
| 20 | 45-55 |
| 18 | 55-65 |
| 16 | 65-75 |
| 15 | 75-85 |
| 14 | 85-100 |
| 12 | 100+ |

In the case of 95% Pd:5% Ni, the average recovery efficiencies over the catalyst cycle ($\overline{\eta}$) correlate best when recovery is predicted based upon the geometric mean of the initial and swelled diameters, but adequate correlation for the 80% Pd:20% Au gauzes can be obtained if recovery is predicted based upon initial diameter, since the effect of swelling seems to be somewhat less pronounced. If it is desired to account for the effect of swelling in a palladium-gold alloy gauze, the geometric mean wire diameter may be estimated by multiplying the initial diameter by 1.1. Often for 95% Pd:5% Ni, the geometric mean diameter can be estimated satisfactorily by multiplying the initial diameter by a factor in the range of from about 1.4 to 1.6, depending on the location of the gauze in the recovery pack with the higher end of the range being used for the first or second layers in the pack and the lower end for the fifth and sixth layers. See Operating Example 11 for more details. Thus, Equation 1 can also be used to estimate average efficiencies if geometric mean wire diameters are used and the recovery gauze cycle length is not exceeded.

Specific Embodiments

As illustrated in FIG. 8, the recovery gauzes of the present invention may be employed in the form of screens 10 having wires 20 and openings 30. As explained, the combination of the diameter of wires 20 and the mesh or number of wires per linear inch determining the mass transfer parameters (MTP) of the screen according to the formula $$MTP = \frac{ad_w}{Re^m \xi^{1-m}}$$

Then, the number of mass transfer units (MTU) represented by a single gauze may be determined from the relationship $$MTU = \frac{2C}{Sc^{\frac{2}{3}}} MTP.$$

As shown in FIG. 9, prior to a typical run, a gauze ensemble 20 is placed into reaction chamber 40 (FIG. 10) of a combustion vessel 42. This ensemble 20 includes a recovery gauze pack 21 and catalyst pack 25 placed adjacent to one another. Catalyst pack 25 contains individual sheets 24 of catalyst in the form of nettings or screens stacked one atop the other. In FIG. 9, the catalyst pack is depicted with seven sheets of catalyst, but it is to be understood that the precise number of sheets is not critical and they may be increased or decreased as needed to effect an essentially complete conversion of ammonia to nitrogen oxides. One such catalyst consists of 90% platinum/5% rhodium/5% palladium, but other platinum-containing catalysts may also be employed with good results. Recovery gauze pack 21 contains two sheets of recovery gauze 22 sandwiched between separator screens 23. The recovery gauze packs must be of sufficient mechanical strength to withstand the force of the process stream at high reaction temperatures while simultaneously enduring the corrosive effects of the residual ammonia, oxygen and nitrogen oxide products which are formed during the process.

Design Example I

A recovery gauze is to be designed for a nitric acid plant operating at 900° C., 10% NH$_3$ and a loading of 15 U.S. tons of nitrogen in ammonia per square meter per day. The plant operates on a cycle length of 130 days, at a pressure of 100 p.s.i.g. To begin, a diagram (FIG. 1) is prepared of the single sheet efficiency of a recovery gauze as a function of mesh size and wire diameter. FIG. 6 is then consulted, and it is determined that an efficiency in excess of 40% should be obtainable. It can be seen from FIG. 1 that a 50 mesh gauze with wires 0.0095 in. in diameter would provide a suitable instantaneous efficiency ($\eta$). Therefore, to allow for swelling, a 50 mesh gauze with wires 0.006 in diameter is prepared from 95% Pd:5% Ni. Upon use in the reactor, the gauze swells by a factor of about 2.5 to a wire diameter of about 0.015 in., providing an efficiency (based on the geometric average wire diameter of 0.0095) in excess of 40%. From FIG. 5, it can be estimated that such a plant can be expected to lose about 0.8 to 0.9 grams of platinum for each ton of nitrogen converted. Thus, about 12.75 grams of platinum per day are presented to each square meter of gauze which weighs about 916 g/m$^2$. Upon operation, the first gauze sheet can be expected to remove over 40% of this for a recovery of about 5.1 grams of Pt per day per square meter of gauze, or about 655 g/m$^2$ over the catalyst cycle. The recovery gauze cycle length coincides closely with the planned cycle length of the plant, so this gauze may be used without a heavier, but less efficient gauze upstream of it. About 0.3 to 0.4 grams of palladium can be expected to be lost for each gram of Pt recovered. Three screens are used to achieve an average recovery efficiency of 78%. A successive finer and lighter screen may about be used downstream to recover a portion of the residual platinum, if so desired.

Design Example II

A gauze is to be designed for a plant similar to that in Design Example I, except that the loading is 57 tons/m$^2$-day, and the cycle length is 60 days. According to FIG. 5, a plant of this type can be expected to lose between about 1.4 and 1.6 grams of Pt per ton of ammonia converted. FIG. 6 shows that an efficiency of more than 17% can be obtained. It can be seen from FIG. 2 that this can be obtained with a 60 mesh screen having a wire diameter of 0.006 in. An 80% Pd:20% Au screen having these dimensions is selected. Upon operation, about 85 grams of Pt are presented to each square meter of the screen and about 14.5 grams are collected each day. Six screens are used to provide an overall average recovery efficiency of 67%.

Design Example III

A gauze is to be designed for a plant having a loading of 100 tons of nitrogen in ammonia per square meter per day, and a cycle length of 60 days. According to FIG. 5, a plant of this size can be expected to lose between about 1.7 and 1.9 grams of platinum for each ton of nitrogen converted, while an efficiency in excess of 12% can be obtained. However, if an 80% Pd:20% Au gauze having a mesh of 80 and a wire diameter of 0.005 in. is used, even though an efficiency of over 15% is obtained, the recovery gauze cycle length is shorter than the catalyst gauze cycle length. Therefore, coarser, heavier gauzes should be inserted upstream of the finer, lighter recovery gauzes after the catalyst gauze. Since an 80 mesh by 0.005 in. wire diameter gauze of 80% Pd:20% Au has a recovery gauze cycle length of 60 days with a platinum recovery of 948 g/m$^2$, the number of grams of Pt presented to each square meter of the first gauze must be decreased from about 180 grams to about 105. Thus, 4 coarse gauzes of 50 mesh by 0.0085 wire diameter should be followed by 4 fine gauzes of 68 mesh by 0.006 wire diameter to achieve an overall recovery of 67%.

Design Example IV

A recovery gauze system is to be designed for a nitric acid plant operating at 4.5 atmospheres pressure and a nitrogen loading of 13.2 tons of nitrogen in ammonia per square meter per day over a catalyst gauze cycle length of 150 days. The catalyst loss rate is known to be 0.144 g. of Pt and Rh per ton of nitrogen. The production rate of the plant is 330 tons of $HNO_3$ per day, and the effective area of the reactor is 5.8 square meters.

If two standard 80 mesh by 0.0031 in wire diameter recovery gauzes of 80% Pd:20% Au are used, the predicted recovery gauze cycle length is only about 130 days, resulting in an average recovery efficiency of the plant cycle length of approximately 46% per gauze or a total of 71% for both gauzes.

By following the procedure of Design Example I, it can be seen that if two 50 mesh by 0.0064 in wire diameter recovery gauzes of 95% Pd:5% Ni are used instead of the standard gauzes, the predicted recovery gauze cycle length for the first gauze slightly exceeds 150 days for an average recovery efficiency over the cycle length of 72% per gauze for a total of 92%.

Thus, each square meter of the improved gauzes of the present invention recover over 370 additional grams of platinum over each cycle length.

In the following Operating Examples, a gaseous stream of air containing about 10% $NH_3$ by volume was fed to the reactor at a rate of 680 standard cubic feet per hour.

Prior to beginning a run, the feed gas was preheated to a temperature within the range of from about 290°-310° C.; during the run the gauze exit temperature was maintained at a relatively constant 930° C. In Operating Examples 1-6, infra, the run was conducted over an approximately 146 hour period, and in Operating Examples 7 and 8, the runs were maintained for approximately 292 and 483 hours, respectively; however, it will be appreciated that, in practice, the reaction period may be varied over a wide range. In Operating Examples 9, 10, 11 and 12, the experiments were conducted in operating nitric acid plants.

This invention will now be illustrated by making reference to examples which specifically describe the gauzes of this invention and their use in recovery processes; however, these examples are illustrative only and this invention should not be construed as being limited to these examples. In these examples, all proportions for the metals comprising the oxidation catalyst and recovery gauzes are in weight percent, unless otherwise stated. All tonnages in this application are in U.S. (i.e., short) tons.

Comparative Operating Example 1

A recovery gauze pack consisting of two 80% Pd:19.4% Au:0.6% Ru, 80 mesh by 0.0039 inch wire diameter gauze sheets was placed between three separator screens, as shown in FIG. 9, and this ensemble was placed into a reactor chamber below 10 sheets of 90Pt/5Rh/5Pd oxidation catalyst having a weight of 4.6769 g. The recovery gauzes had a mesh (N) of 80 and wire diameter ($d_w$) of 0.0031 inches. The surface area of each recovery screen (bulk surface area of the wires per unit volume of screen) was 263 in.$^{-1}$.

Feed gas consisting of ammonia and air was forced through the oxidation catalyst and recovery gauze pack as a mixed gas stream under a pressure of 100 p.s.i.g. for a loading of 57 tons of nitrogen per square meter per day. The yield of nitrogen oxides ($NO_x$) was about 95%.

The average recovery efficiency ($\eta^*$) for the Pd/Au recovery gauze pack was determined from assay data by measuring the Pt gain of each recovery gauze and the Pt loss of the ammonia oxidation catalyst (i.e., the oxidation gauze pack) as follows:

$$\eta^* = \frac{\text{Pt Gain Per Recovery Gauze}}{\text{Pt Loss of Oxidation Gauze Pack} - \text{Total Pt Gain For Preceding Gauzes}}$$

Following the run, the catalyst weighed 4.3951 g., and subsequent assay data showed a Pt loss of 0.4203 g. in the oxidation catalyst. By comparison, the first layer of the recovery gauze pack weighed 0.5965 g., with a Pt gain of 0.0853 g. Based on this data, the average Pt pick-up efficiency ($\eta'$) of the first recovery gauze was found to be 20.3%. In calculating the Pt pick-up efficiency of the second recovery gauze, the weight of Pt gained by the first recovery gauze must be taken into account. The second layer of the recovery gauze pack weighed 0.5747 g. with a Pt gain of 0.0592 g., and the Pt pick-up efficiency of the second recovery gauze was found to be 17.67%. The average Pt recovery efficiency was found to be 19.00%.

Similar comparative studies on similar recovery gauze screens of varying mesh (N) and wire diameter ($d_w$) were conducted, using the procedure described in Example 1 to further confirm the applicability of the present model. In each study, the gauze screens and catalysts employed were weighed prior to use and immediately thereafter. Gauze assays were conducted for individual gauze sheets to obtain the average Pt recovery efficiency ($\eta$). Table II summarizes the geometry of the recovery gauzes employed in Operating Examples 1-6. Based upon these geometries and the flow conditions, the dimensionless mass transfer unit for a single screen was calculated from $$MTU = \frac{2C}{Sc^{\frac{2}{3}}} \cdot \frac{ad_w}{Re^m \xi^{1-m}}.$$

Predicted average recovery efficiency ($\overline{\eta}$) of a single sheet could then be estimated using the formula $\overline{\eta} = 1 - \exp(-MTU)$. In all runs, the conversion of nitrogen oxides was in the range of 95-98.9%.

The Pt loss for the catalyst of Operating Examples 1-6, the Pt gains for the respective recovery screens, and their recovery efficiencies are set forth in Table III. These results are represented in FIG. 7, illustrating the correlation of the present invention between recovery efficiency ($\eta$) and MTU.

TABLE II

| Example | Gauze Type | Mesh Size N (in.$^{-1}$) | Wire Diameter $d_w$ (in.) | Screen Area "a" (in.$^{-1}$) | Volumetric Void Fraction ($\xi$) | MTU |
|---|---|---|---|---|---|---|
| 1,2 | 4 | 80 | 0.0039 | 263 | 0.743 | 0.210 |
| 3,4 | 2 | 80 | 0.0031 | 257 | 0.799 | 0.186 |
| 5 | 3 | 50 | 0.0039 | 160 | 0.844 | 0.122 |
| 6 | 6 | 24 | 0.0080 | 77 | 0.846 | 0.075 |

TABLE III

| Example | Runs | No. of Sheets | Initial Weight (gr) | Initial Pt (%) | Final (146 hours) Weight (gr) | Final (146 hours) Pt (%) | Pt Loss (gr) | Pt Gain (gr) | Pt Recovery Efficiency (%) |
| --- | --- | --- | --- | --- | --- | --- | --- | --- | --- |
| 1 | Pt/5Rh/5Pd Type 4 | 10 | 4.6769 | 90 | 4.3951 | 86.20 | 0.4203 | — | — |
|  | 1st Layer | 1 | 0.5475 | — | 0.5965 | 14.30 | — | 0.0853 | 20.30 |
|  | 2nd Layer | 1 | 0.5442 | — | 0.5747 | 10.30 | — | 0.0592 | 17.67 |
|  |  |  |  |  |  |  |  |  | 19.00 avg. |
| 2 | Pt/5Rh/5Pd Type 4 | 10 | 4.6957 | 90 | 4.4631 | 87.20 | 0.3343 | — | — |
|  | 1st Layer | 1 | 0.5390 | — | 0.5768 | 10.68 | — | 0.0616 | 18.43 |
|  | 2nd Layer | 1 | 0.5372 | — | 0.5615 | 8.08 | — | 0.0454 | 16.64 |
|  |  |  |  |  |  |  |  |  | 17.54 avg. |
| 3 | Pt/5Rh/5Pd Type 2 | 10 | 4.6872 | 90 | 4.4282 | 87.60 | 0.3394 | — | — |
|  | 1st Layer | 1 | 0.2900 | — | 0.3197 | 11.28 | — | 0.0361 | 10.63 |
|  | 2nd Layer | 1 | 0.2873 | — | 0.3104 | 10.96 | — | 0.0340 | 11.22 |
|  |  |  |  |  |  |  |  |  | 10.93 avg. |
| 4 | Pt/5Rh/5Pd Type 2 | 10 | 4.6955 | 90 | 4.3885 | 90.10 | 0.2720 | — | — |
|  | 1st Layer | 1 | 0.2942 | — | 0.2985 | 11.80 | — | 0.0352 | 12.95 |
|  | 2nd Layer | 1 | 0.2849 | — | 0.2890 | 13.40 | — | 0.0387 | 16.36 |
|  |  |  |  |  |  |  |  |  | 14.67 avg. |
| 5 | Pt/5Rh/5Pd Type 3 | 10 | 4.6865 | 90 | 4.3604 | 90.24 | 0.2831 | — | — |
|  | 1st Layer | 1 | 0.3070 | — | 0.3360 | 11.70 | — | 0.0393 | 13.89 |
|  | 2nd Layer | 1 | 0.3189 | — | 0.3433 | 13.50 | — | 0.0463 | 19.02 |
|  |  |  |  |  |  |  |  |  | 16.49 avg. |
| 6 | Pt/5Rh/5Pd Type 6 | 10 | 4.6958 | 90 | 4.3455 | 86.60 | 0.4630 | — | — |
|  | 1st Layer | 1 | 0.6027 | — | 0.6284 | 6.21 | — | 0.0390 | 8.43 |
|  | 2nd Layer | 1 | 0.6136 | — | 0.6408 | 5.99 | — | 0.0384 | 9.05 |
|  |  |  |  |  |  |  |  |  | 8.73 avg. |

Operating Example 7

A recovery gauze pack, designed according to the principles of the present invention, consisting of two recovery gauze sheets (95Pd/5Ni) was placed between three separator screens, as depicted in FIG. 9, and this ensemble was placed into a reaction chamber of the type shown in FIG. 8 below a 90Pt/5Rh/5Pd oxidation catalyst (15 sheets). The recovery gauzes were 60 mesh and had wire diameters ($d_w$) of 0.006 inches. The ammonia oxidation catalyst weighed 7.1066 g. The separator screens were in the form of a wire mesh gauze constructed from a ferrous alloy.

The ammonia and air feed was forced through the reaction chamber over a 292 hour period as a mixed gas stream under a pressure of 100 p.s.i.g. for a nitrogen loading of 57 tons/m²-day.

The average Pt pick-up efficiency ($\bar{\eta}$) for the Pd/Ni recovery gauzes were determined by measuring the Pt gain of each recovery gauze and the Pt loss for the ammonia oxidation catalyst from assay data.

Following the run, the catalyst weighed 6.1783 g., and the subsequent assay data showed a Pt loss of 1.0393 g. in the oxidation catalyst. The first layer of the recovery gauze pack weighed 1.0110 g., and recovered 0.2709 g of platinum, based on the gauze assay data for an average platinum pick-up efficiency ($\bar{\eta}$) of 26.07%. The second layer of the recovery gauze pack weighed 0.9560 g. and recovered of 0.1998 g. of platinum, based on the gauze assay data for a platinum pick-up efficiency of 26.0%. The average platinum recovery efficiency was found to be 26.04%, which is an extremely significant improvement over known getters operated under similar reaction conditions.

The gauze screens and catalyst employed in each study were measured and weighed prior to use and immediately thereafter. Assays were conducted on the catalyst and individual gauze sheets in the manner described in the preceding paragraph to determine the average platinum recovery efficiency ($\bar{\eta}$).

The configurations of the recovery gauzes employed in this study are set forth in Table VI:

TABLE IV

| Period | Gauze Type | Mesh Size N (in.⁻¹) | Wire Diameter $d_w$ (in.) | Screen Area "a" (in.⁻¹) | Volumetric Void Fraction ($\xi$) | MTU |
| --- | --- | --- | --- | --- | --- | --- |
| Start of Run | Ni-1 | 60 | 0.006 | 200 | 0.699 | 0.184 |
| End of Run | Ni-1 | 60 | 0.0126 | 236 | 0.256 | 0.367 |

On the basis of this study, the geometric average mass transfer unit for the recovery gauzes was calculated at 0.260.

Operating Example 8

The procedure of Operating Example 7 was repeated, except that the recovery gauze was operated over a period of 483 hours. The results of this study, inclusive of platinum loss, platinum gain for the recovery gauzes, and their recovery efficiencies are set forth in Table V. These results are also represented in FIG. 7.

TABLE V

| Example | Runs | No. of Sheets | Initial Weight (gr) | Initial Pt (%) | Final Weight (gr) | Final Pt (%) | Pt Loss (gr) | Pt Gain (gr) | Pt Recovery Efficiency (%) |
|---|---|---|---|---|---|---|---|---|---|
| 7. | Pt/5Rh/5Pd | 15 | 7.1066 | 90 | 6.1783 (292 hours) | 86.70 | 1.0393 | — | — |
|  | Type Ni-1: |  |  |  |  |  |  |  |  |
|  | 1st Layer | 1 | 0.8493 | — | 1.0110 | 26.80 | — | 0.2709 | 26.07 |
|  | 2nd Layer | 1 | 0.8505 | — | 0.9560 | 20.90 | — | 0.1998 | 26.00 |
|  |  |  |  |  |  |  |  |  | 26.04 avg. |
| 8. | Pt/5Rh/5Pd | 15 | 7.1392 | 90 | 5.8563 (438 hours) | 89.60 | 1.1781 | — | — |
|  | Type Ni-1: |  |  |  |  |  |  |  |  |
|  | 1st Layer | 1 | 0.8303 | — | 1.0311 | 32.10 | — | 0.3310 | 28.10 |
|  | 2nd Layer | 1 | 0.8232 | — | 0.9953 | 27.50 | — | 0.2737 | 32.31 |
|  |  |  |  |  |  |  |  |  | 30.24 avg. |

The improvement in Pt recovery efficiency $\bar{\eta}$ for the 95Pd/5Ni recovery gauzes of Operating Examples 7 and 8 is illustrated by Table VI. The beneficial effects attributable to the use of palladium/nickel and the high average mass transfer units for the Pd/Ni gauzes of this invention makes them particularly suitable for platinum/rhodium metal recovery. The data in Table VI demonstrates the advantages of the Pd/Ni recovery gauzes of this invention and the improvement in platinum recovery efficiency for the 95Pd/5Ni recovery gauzes of Examples 7 and 8, when compared against an 80Pd/19.4Au/0.6Ru recovery gauze of Examples 3 and 4 having a similar initial MTU.

TABLE VI
PLATINUM RECOVERY EFFICIENCY

| Example | Composition: 80Pd/19.4Au/0.6Ru Type 2 80 Mesh, 3 Mil Diameter (Initial MTU: 0.186) | Composition: 95Pd/5Ni Type Ni-1 60 Mesh, 6 Mil Diameter (Initial MTU: 0.184) |
|---|---|---|
| 3 | 10.93% | — |
| 4 | 14.67% | — |
| 7 | — | 26.04% |
| 8 | — | 30.24% |

Comparative Operating Example 9

A recovery gauze pack consisting of five 80% Pd:20% Au, 24 mesh by 0.008 inch diameter wire gauze sheets were placed between six separator screens in an arrangement similar to that shown in FIG. 9. This ensemble was placed immediately downstream of a platinum alloy ammonia oxidation catalyst pack (90Pt/5Rh/5Pd) in a nitric acid plant having a nitrogen loading of 78 tons nitrogen (calculated as ammonia) per square meter of the effective cross-sectional area of the recovery gauze per day (i.e., 78T(N)/m²/d). The plant was operated for 77 days, during which the oxidation catalyst lost 205 troy ounces in weight, of which 92% of 188 troy ounces were estimated to be platinum. At the end of the 77 day operating cycle, the recovery gauze ensemble was removed, weighed and assayed to determine the amount of platinum recovered. Platinum recovery was found to be 42 troy ounces or approximately 22% of the estimated lost platinum.

The mass transfer unit (MTU) for a single gauze in the recovery pack was calculated to be 0.05, based on its mesh (24), wire diameter (0.008 inches) and nitrogen loading (78T(N)/m²/d). The total calculated platinum recovery for the five sheets was 24%, a figure which compares favorably with the observed recovery of 22%.

To illustrate the effectiveness of this system, a recovery gauze pack was constructed by placing five gauze sheets (manufactured from an alloy of 80Pd/19.4Au/0.6Ru, having a mesh of 36 and a wire diameter of 0.0071 inches) individually between six separator screens. The recovery gauze pack thus constructed was placed into a reactor with a nitrogen loading of 78T(N)/m²/d. In this operation, the single gauze mass transfer unit (MTU) was calculated at 0.082, and it was predicted that five sheets of recovery gauze would recover about 34% of the platinum lost from the oxidation gauze catalyst.

The recovery gauze pack was installed in the plant immediately downstream of the oxidation gauze pack and the plant was operated for 78 days, during which the oxidation gauze lost 213 troy ounces in weight, of which 92% or 196 troy ounces was estimated to be platinum. At the end of the 78 day cycle, the recovery gauze pack was removed and the quantity of platinum recovered was found to be 35%, based on the recovery gauze pack weight and platinum assay. This figure compares favorably with the predicted recovery of 34%. These data are represented on FIG. 7.

COMPARATIVE OPERATING EXAMPLE 10

A recovery gauze pack consisting of six 36 mesh and 0.0071 inch diameter wire recovery gauze sheets were individually placed between seven separator screens. The recovery gauze sheets were manufactured from an alloy composed of 80 weight percent palladium, 19.4 weight percent gold and 0.6 weight percent ruthenium. The recovery gauze was placed immediately downstream of a platinum alloy ammonia oxidation catalyst pack (90Pt/10Rh) in a nitric acid plant having a nitrogen loading of 65 tons (in ammonia) per square meter of reactor cross-sectional area per day, (i.e., 65T(N)/m²/d). The plant was operated for 61 days, during which the catalyst pack lost 137 troy ounces in weight, of which 92% or 126 troy ounces were estimated to be platinum. Based on the wire size and mesh of the recovery gauze sheet and the nitrogen loading for the particular plant, the mass transfer unit (MTU) of a single gauze was found to be 0.093, and the predicted total pack recovery for platinum was calculated at 43%. This predicted recovery figure (43%) compared favorably with the actual or observed platinum recovery of 52%. This result is shown on FIG. 7.

OPERATING EXAMPLE 11

A platinum recovery gauze pack consisting of 95% Pd/5% Ni were individually placed between seven separator screens. This pack contained six sheets of platinum recovery gauze, the first three having a mesh of 45 and a wire diameter of 0.0083 inches and the last three having a mesh of 60 and a wire diameter of 0.005 inches. This pack was placed immediately downstream of a 90Pt/5Rh/5Pd alloy ammonia oxidation catalyst gauze pack in a nitric acid plant having a nitrogen throughput of 38 tons (in ammonia) per square meter effective gauze cross-sectional area per day (i.e., 38T(N)/m²/d). The furthest upstream of the platinum recovery gauzes was gauze sheet 1, followed by gauze sheets 2, 3, 4, 5 and 6, that is, gauze sheet 6 was located the furthest downstream of all of the gauzes. The plant was operated continuously for 71 days during which the ammonia oxidation catalyst pack lost 443 troy ounces in weight, of which 408 troy ounces (92%) were estimated to be platinum.

At the end of the 71st day in the operating cycle, the platinum recovery gauze was removed from the plant and disassembled for inspection. During operation, the recovery gauze wires increased in size over their original diameter, and this increase significantly affected their mass transfer unit values. The wire swelling factor (S) for each gauze sheet was determined according to the following equation:

$$S = \frac{\text{(Average Final Wire Diameter)} - \text{(Initial Wire Diameter)}}{\text{(Initial Wire Diameter)}}$$

and the results of these determinations are set forth in Table VII.

TABLE VII

| Gauze Sheet | Average Swelling Factor (S) |
| --- | --- |
| 1 | 1.45 |
| 2 | 1.30 |
| 3 | 1.08 |
| 4 | 1.08 |
| 5 | 0.90 |
| 6 | 0.90 |

On the basis of the initial wire diameter, mesh size and nitrogen throughput, the total platinum recovery for the gauze pack could be predicted to be 69.8%. On the basis of the final wire diameters for each platinum recovery gauze with identical mesh and nitrogen loading parameters, the total platinum recovery could be predicted to be 83.7%. The recovery, properly based on geometric mean of the final and initial diameters of the wires in the recovery gauze, is 76.4%.

An assay of the platinum recovery gauze pack showed an actual total pack recovery of 306 troy ounces of platinum (75.0%). The observed recovery of 75.0% compares favorably with the predicted recovery of 76.4.

A summary of the parameters for the recovery gauze packs of Operating Examples 9-11 and their respective recoveries of platinum metal are set forth in Table VIII, infra.

TABLE VIII

| Example Number | Nitrogen Throughput [T(N)/m²/d] | Number of Gauzes | Mesh | Wire Diameter (In.) | Alloy Composition (%) | Cycle Length (Days) | (MTU) | Volumetric Void Fraction ( ) | Total Pack Platinum Recovery | |
| --- | --- | --- | --- | --- | --- | --- | --- | --- | --- | --- |
| | | | | | | | | | Predicted (%) | Observed (%) |
| 9 | 78 | 5 | 24 | 0.008 | 80Pd/20Au | 77 | 0.055 | 0.846 | 24 | 22 |
| | 78 | 5 | 36 | 0.0071 | 80Pd/20Au* | 78 | 0.082 | 0.793 | 34 | 35 |
| 10 | 65 | 6 | 36 | 0.0071 | 80Pd/20Au* | 61 | 0.093 | 0.793 | 43 | 52 |
| 11 | 38 | 3 | 45 | 0.0083 | 95Pd/5Ni | 71 | 0.199 | 0.687 | 70 | 75 |
| | | 3 | 60 | 0.005 | | | | | 76** | — |

NOTES:
*Nominal Composition: 80Pd/20Au
 Actual Composition: 80Pd/19.4Au/0.6Ru
**This figure is the geometric mean predicted platinum recovery based on the initial and final wire diameters.

OPERATING EXAMPLE 12

A recovery gauze pack consisting of two gauze sheets (80 Pd/19.6 Au/0.4 Ru) were placed between three separator screens, and this ensemble was placed into a first reaction chamber below a 90 Pt/5 Rh/5 Pd oxidation catalyst (10 sheets). The Pd/Au gauzes have a mesh of 36 wires per linear inch (N) and a wire diameter ($d_w$) of 0.0071 inches (N×$d_w$:0.256). The oxidation catalyst weighed 4.6963 g., and the recovery gauze pack weighed 5.1737 g. prior to the run. The surface area "a" of each recovery screen, that is, the surface area of the wires per unit volume of screen packing, was 117 in²/in³ and 0.555 ft² per Troy ounce of recovery gauze. The separator screens were in the form of wide mesh gauze constructed from a ferrous alloy.

In a second chamber, located immediately behind the first chamber, there was placed a second gauze pack consisting of two recovery screens (80% Pd:20% Au), sandwiched between three separator screens.

The two chambers were preheated to 300° C. and ammonia and air were channeled therethrough as a mixed gas stream under a pressure of 100 p.s.i.g. at a total flow of 680 SCFH. Ammonia constituted 10% of the gaseous mixture representing a throughput of 57 tons nitrogen per square meter per day, that is, 57 t(N₂)m²d. During this run, the first chamber was maintained at a temperature of 930° C., and the second chamber was maintained at 890° C. The test was run over a 146 hour period, and the yield of nitrogen oxides (NO$_x$) was 98.4%.

The weight recovery efficiency ($\eta'$) for the Pd/Au gauzes was determined by measuring the weight gain of each recovery gauze pack and the weight loss for the ammonia oxidation catalyst. The difference in weight was then converted to weight recovery efficiency ($\eta'$) according to the following equation:

$$\eta' = 1 - (1 - R)^{1/n}$$

where n and $\eta'$ are as defined hereinabove, and R is the weight of precious metal recovered by the recovery gauze pack divided by the weight of precious metal in the stream presented to the pack.

Following the run, the catalyst weighed 4.3973 g., a loss of 0.2989 g. from its starting weight. By comparison, the recovery gauze pack in the first chamber weighed 5.2350 g., a gain of 0.0623 g. Based on this data, the pick-up efficiency ($\eta'$) of the recovery gauze pack in the first chamber was found to be 14.6%. In calculating the weight pick-up efficiency of the recovery gauze pack in the second chamber, the weight recovery efficiency of the first chamber must be taken into account.

Comparative studies were conducted by repeating this procedure on recovery gauze screens of varying mesh (N) and wire diameter ($d_w$). In each study, the gauze screen and catalyst employed were weighed prior to use and immediately thereafter, and the the weight changes were converted to weight recovery efficiency ($\eta'$). Both runs were conducted over an identical trial period. The configurations of the catalyst and recovery gauzes employed in Examples 12–17 are set forth in Table IX. Both experiments afforded yields of nitrogen oxides in the range of 96–98.9%.

TABLE IX

| Op. Ex. | Type | Mesh (N) | Wire Diameter $d_w$ (inches) | Specific Screen Wgt. (Troy Oz/ft$^2$) | Screen Area in$^2$/in$^3$ | ft$^2$/Troy Oz. | $N \times d_w$ |
|---|---|---|---|---|---|---|---|
| 12 | 1 | 36 | 0.0071 | 2.99 | 117 | 0.555 | 0.256 |
| 13 | 2 | 80 | 0.0031 | 1.31 | 257 | 1.210 | 0.248 |
| 14 | 3 | 50 | 0.0039 | 1.31 | 160 | 0.939 | 0.195 |
| 15 | 4 | 80 | 0.0039 | 2.07 | 263 | 0.990 | 0.312 |
| 16 | 5 | 50 | 0.0071 | 4.15 | 167 | 0.569 | 0.355 |
| 17 | 6 | 24 | 0.0080 | 2.69 | 77 | 0.457 | 0.192 |

The weight loss for the catalyst of Operating Examples 12–17 and the weight gains for the respective recovery screens and their recovery efficiencies are set forth in Table X:

TABLE X

| Op. Ex. | Runs | *No. of Sheets | Weight of Each Pack New, g. | Weight of Each Pack After Use, g. | Weight gain (Used − New), g. | Efficiency $\eta'$ |
|---|---|---|---|---|---|---|
| 12 | Pt/5Rh/5Pd | 10 | 4.6963 | 4.3973 | −0.2990 | — |
|  | Type 1 | 2 × 3 | 5.1958 | 5.2769 | +0.0811 | 14.6 |
|  | Type 1 | 2 × 3 | 5.1737 | 5.2350 | +0.0613 | 15.5 |
| 13 | Pt/5Rh/5Pd | 10 | 4.6872 | 4.4282 | −0.2610 | — |
|  | Type 2 | 2 × 3 | 4.1930 | 4.2574 | +0.0644 | 13.2 |
|  | Type 2 | 2 × 3 | 4.2136 | 4.2596 | +0.0460 | 12.5 |
| 14 | Pt/5Rh/5Pd | 10 | 4.6865 | 4.3604 | −0.3261 | — |
|  | Type 3 | 2 × 3 | 4.2480 | 4.3162 | +0.0682 | 11.1 |
|  | Type 3 | 2 × 3 | 4.2367 | 4.2930 | +0.0553 | 11.3 |
| 15 | Pt/5Rh/5Pd | 10 | 4.6957 | 4.4631 | −0.2326 | — |
|  | Type 4 | 2 × 3 | 4.7025 | 4.7766 | +0.0741 | 17.5 |
|  | Type 5 | 2 × 3 | 5.7280 | 5.7934 | +0.0654 | 23.4 |
| 16 | Pt/5Rh/5Pd | 10 | 4.7027 | 4.4525 | −0.2526 | — |
|  | Type 4 | 2 × 3 | 4.7260 | 4.8035 | +0.0775 | 16.9 |
|  | Type 5 | 2 × 3 | 5.7054 | 5.7664 | +0.0610 | 19.6 |
| 17 | Pt/5Rh/5Pd | 10 | 4.6958 | 4.3455 | −0.3503 | — |
|  | Type 6 | 2 × 3 | 4.8494 | 4.9162 | +0.0668 | 10.0 |
|  | Type 6 | 2 × 3 | 4.8538 | 4.9134 | +0.0598 | 11.2 |

*"2 × 3" indicates that two recovery gauze sheets and three separator sheets

This data confirms the high order of recovery ($\eta'$) attributed to the recovery gauzes of this invention. Furthermore, it demonstrates that the gauzes of Operating Examples 15&16, having values of the product of mesh and wire size above 0.3, provide excellent recovery efficiency.

Assays were conducted to compare platinum recovery efficiency ($\bar{\eta}$) against weight recovery efficiency ($\eta'$). Also, these assays confirm that the gauzes recover both platinum and rhodium. See in this regard Table XI, where the results of these studies are set forth inclusive of platinum and rhodium recovery expressed as a ratio.

TABLE XI

| Type | $N \times d_w$ | $\eta'$ (%) | $\bar{\eta}$ (%) | Pt/Rh Recovery |
|---|---|---|---|---|
| 3 | .195 | 11.1 | 16.5 | — |
| 2 | .248 | 13.2 | 10.9 | 46.3 |
| 4 | .312 | 15.9 | 17.5 | 39.9 |

On the basis of these studies, it was determined that palladium/gold recovery gauzes having a mesh size (N) in the range of from about 50–80 and a wire diameter ($d_w$) in the range of from about 0.003 to 0.018 inches, exhibit particularly suitable precious metal recovery properties provided they possess an $N \times d_w$ of at least about 0.3.

It was also found that the recovery gauzes in the first reaction chamber and the recovery gauzes of the same material and configuration in the second reaction chamber exhibited no significant difference in weight recovery efficiency ($\eta'$). Moreover, it appears from this data that significantly improved results are obtained using recovery gauzes of the type described in Operating Examples 15–16, which possess the required values of $N \times d_w$. Significantly, these particular recovery gauzes exhibit an initial $N \times d_w$ parameter of at least 0.3.

The foregoing data shows that the efficiency of an 80% palladium and 20% gold recovery gauze in ammonia oxidation process is significantly improved by constructing said gauze to an initial $N \times d_w$ parameter of at least about 0.3. A preferred embodiment of this invention comprises a recovery gauze ensemble comprised of several such recovery screens sandwiched between several separator screens.

The following example illustrates the improvement in weight recovery efficiency which can be realized with Pd/Ni recovery gauzes.

OPERATING EXAMPLE 18

A recovery gauze pack consisting of two recovery gauze sheets (Type Ni-B: 95% Pd/5% Ni) was placed between separator screens and this ensemble was placed into a first reaction chamber below a 90% Pt/5% Rh/5% Pd oxidation catalyst (15 sheets). The recovery gauzes contained 60 wires per linear inch (N) and had a wire diameter ($d_w$) of 0.006 inches ($N \times d_w = 0.36$). The ammonia oxidation catalyst weighed 7.107 g., and the recovery gauze pack weighed 5.164 g. prior to the run. The separator screens were in the form of a wide mesh gauze constructed from a ferrous alloy.

In a second chamber located immediately downstream from the first chamber, there was placed a second gauze pack also consisting of two recovery screens (Type Ni-A: 95% Pd/5% Ni) sandwiched between three separator screens. The recovery gauzes contained 45 wires per linear inch (N) and had a wire diameter ($d_w$) of 0.006 inches ($N \times d_w = 0.27$). The recovery gauze pack weighed 4.666 g. prior to the run.

The two chambers were preheated to 300° C. and ammonia and air were channeled therethrough as a mixed gas stream under a pressure of 100 p.s.i.g. at a total flow of 680 SCFH. During the operation, the first chamber was maintained at a temperature of 930° C. and the second chamber was maintained at 890° C. Ammonia constituted 10% of the gaseous mixture, representing a throughput of 57 tons nitrogen per square meter per day, that is, 57 t($N_2$)/$m^2$d.

The weight recovery efficiency ($\eta'$) for the Pd/Ni recovery gauzes in each reactor chamber was determined by measuring the weight gain of each recovery gauze pack and the weight loss for the ammonia oxidation catalyst. These measurements were then converted to weight pick-up Efficiency ($\eta'$) as per the equation: $\eta' = 1 - (1-R)^{1/n}$ wherein n, $\eta'$ and R are as previously defined. Following the run, the catalyst weighed 6.178 g., a loss of 0.929 g. from its original weight. By comparison, the recovery gauze in the first chamber weighed 5.452 g., a gain of 0.288 g. The recovery gauze in the second chamber weighed 4.826 g., a gain of 0.160 g. On the basis of this data, the weight recovery efficiency ($\eta'$) of the second chamber recovery gauze was 13.4%.

The used ammonia oxidation catalyst pack and the two recovery gauze assemblies were assayed to determine their actual platinum recovery efficiency ($\bar{\eta}$) as well as confirm that the Pd/Ni alloy recovery gauze recovered Rh to the same extent as the Pd/Au alloy recovery gauzes. The results of these assays are shown in Table XII where platinum and rhodium recoveries are expressed as a ratio.

TABLE XII

| Chamber | Type | N | $d_w$ (in) | $N \times d_w$ | Efficiencies $\eta'$ (%) | $\bar{\eta}$ (%) | Recovery of Pt/Rh |
|---|---|---|---|---|---|---|---|
| 2 | Ni-A | 45 | 0.006 | 0.27 | 13.4 | 10.8 | 27.0 |
| 1 | Ni-B | 60 | 0.006 | 0.36 | 16.9 | 26.0 | 50.7 |

Operating Example 18 illustrates that both nickel-containing alloys and gold-containing alloys are effective in recovering platinum and rhodium lost from ammonia oxidation catalysts, and that the characteristically improved recovery efficiency associated with a high $N \times d_w$ product applies equally to the gold and non-gold-containing alloy recovery gauzes of this invention.

We claim:

1. A method for the recovery of platinum and/or rhodium lost from a platinum-containing catalyst during ammonia oxidation processes at temperatures above 850° C.; which comprises bringing said lost platinum and/or rhodium into contact with a foraminate element fabricated from material consisting essentially of palladium characterized by (a) a novel configuration whereby the initial product of mesh size (N) and wire diameter ($d_w$) for said element is greater than at least about 0.3 and (b) where, for a given nitrogen throughput, the weight recovery efficiency ($\eta'$) is a function of the wire diameter ($d_w$) and mesh size (N) combination and weight recovery efficiency is improved by increasing mesh size (N) for a given wire diameter or increasing the wire diameter ($d_w$) for a given mesh size.

2. The method according to claim 1 wherein the initial product of N and $d_w$ is in the range of from about 0.3 to about 0.9.

3. The method according to claim 1 wherein said element is a woven gauze.

4. The method according to claim 1 wherein one or more of said elements are sandwiched between a plurality of screens.

5. The method according to claim 1 wherein said element consists essentially of palladium alloyed with one or more metals selected from the group consisting of cobalt, platinum, ruthenium, iridium, gold, silver and copper.

6. The method according to claim 5 wherein the element consists essentially of palladium and gold, said palladium being present in an amount of at least about 80% by weight.

7. The method according to claim 1 wherein N is in the range of from about 50–80, $d_w$ is in the range of from about 0.003 to 0.018 and their respective values are such that the initial product of $N \times d_w$ is greater than at least about 0.3.

8. The method according to claim 1 wherein the initial product of $N \times d_w$ is in the range of from about 0.35–0.9.

9. In the method for the recovery of platinum and/or rhodium lost from a platinum-containing catalyst during ammonia oxidation processes at temperatures above 850° C. by bringing said lost platinum and/or rhodium into contact with a foraminate element; the imrovement which comprises utilizing for recovery purposes a foraminate element fabricated from a material consisting essentially of palladium, characterized by (a) a novel configuration whereby the initial product of mesh size (N) and wire diameter ($d_w$) for said element is greater than at least about 0.3 and (b) where, for a given nitrogen throughput, the weight recovery efficiency ($\eta'$) is a function of the wire diameter ($d_w$) and mesh size (N) combination and weight recovery efficiency is improved by increasing the mesh size (N) at a given wire diameter or increasing the wire diameter ($d_w$) at a given mesh size.

10. The method according to claim 9 in which the initial product of N and $d_w$ is from about 0.30 to about 0.90.

11. The method according to claim 9 wherein said element is a woven gauze.

12. The method according to claim 9 wherein one or more of said elements are sandwiched between a plurality of separator screens.

13. The method according to claim 9 wherein said element consists essentially of palladium alloyed with one or more metals selected from the group consisting of platinum, cobalt, ruthenium, iridium, gold, silver and copper.

14. The method according to claim 13 wherein said element consists essentially of palladium and at least about 19.5% gold.

15. The method according to claim 9 wherein N is in the range of from about 50–80, $d_w$ is in the range of from about 0.003 to 0.018, and their respective values are such that the initial product of $N \times d_w$ is greater than at least about 0.3.

16. The method according to claim 9 wherien the initial product of $N \times d_w$ is in the range of from about 0.35 to 0.9.

* * * * *